Oct. 16, 1923.
W. A. DOREY
REFRACTOR
Filed Feb. 27, 1920
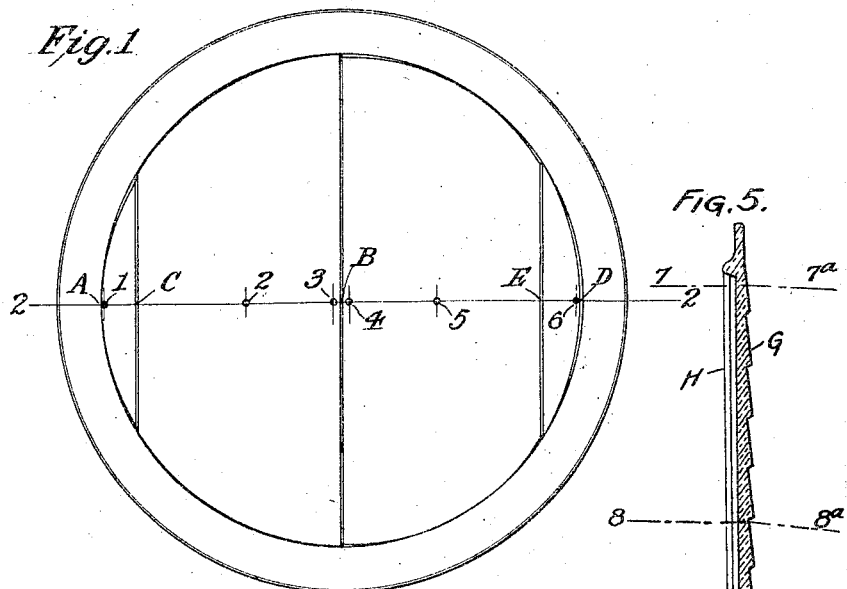
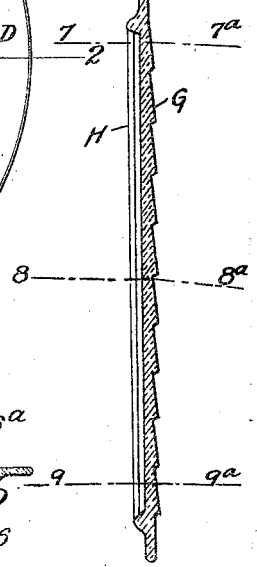
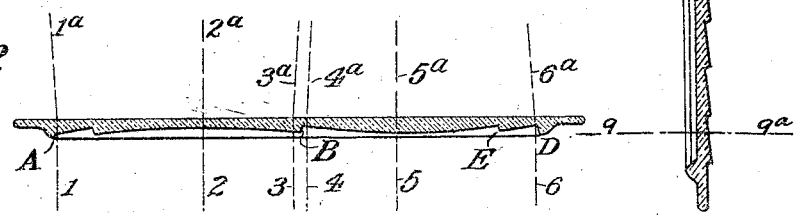
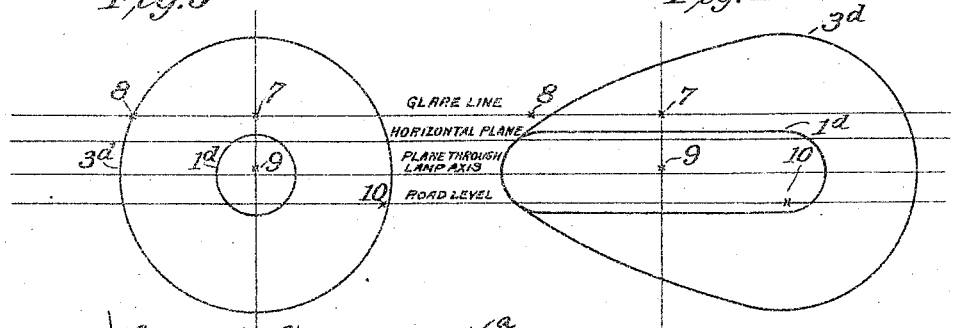
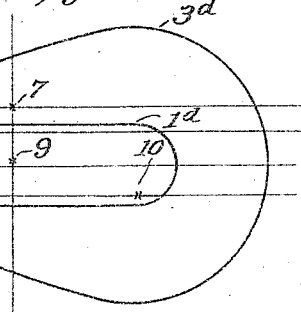
Inventor
William A. Dorey
By his Attorney
Joseph Liberman Patented Oct. 16, 1923

1,470,602

UNITED STATES PATENT OFFICE.

WILLIAM A. DOREY, OF NEWARK, OHIO, ASSIGNOR TO HOLOPHANE GLASS COMPANY, INC., OF NEW YORK, N. Y., A CORPORATION OF NEW JERSEY.

REFRACTOR.

Application filed February 27, 1920. Serial No. 361,734.

*To all whom it may concern:*

Be it known that I, WILLIAM A. DOREY, a citizen of the United States, and resident of Newark, in the county of Licking and State of Ohio, have invented certain new and useful Improvements in Refractors, of which the following is a specification.

The object of my invention is to construct a refractor for light rays, especially adapted for automobile lamps and the like which will direct the light rays in definite zones, complying with the requirements of modern regulations with reference to such refracting lenses. This object is obtained by constructing a plate which will produce a broad beam of light of maximum depth at one extremity and a minimum depth at the other extremity. The invention has been developed for use principally with automobile head-lights but it has a range of use other than this, and can be used for any lighting specification requiring a refractor to fulfill the conditions set forth.

Fig. 1 is the back view of an automobile plate embodying my invention. Fig. 2 is a horizontal cross section of Fig. 1 on the line 2/2. Fig. 3 is a diagrammatic exposition of the spot produced by an unmodified headlight on a vertical screen. Fig. 4 is a diagrammatic exposition of the spot produced on a vertical screen by a headlamp employing my invention. Fig. 5 is a vertical cross-section of a plate embodying a modification of the invention. Fig. 6 is a horizontal cross-section of a plate embodying a further modification thereof.

This construction, as hereinafter explained, will enable the approaching driver to pass with safety and to do so he must be protected against glare from a position 200 feet in front to the position of passing. At the same time this construction will enable the driver behind the lamps to see the full width of the road one hundred feet in front of him and also discern large objects directly in front or to the right side of the road, the direction in which he must turn to pass the approaching driver at distance of two hundred feet or more. The diagram of the spot produced by a bare headlamp with parabolic reflector, Figure 3, can be used to indicate the problem involved.

If it be assumed that the light source is spherical, the circle $3^d$ represents the spot of light produced on a vertical screen at one hundred feet distance by the widest cone of light from an unmodified headlamp and the circle $1^d$ represents the spot from the narrowest cone. The widest cones of reflected light will originate at the center of the reflector and the narrowest cones of light will originate at the perimeter of the reflector. In any plane thru the axis of the reflector the spread of the cones of light proceeding from the reflector will decrease as the edge of the reflector is approached. If the light source be in focus the spots or images from all the cones of light will be substantially concentric. Since all cones will contribute to the illumination within boundary $1^d$, that portion of the spot will be brightest and since fewer cones contribute to the illumination as the boundary $3^d$ is approached the intensity of the light will drop as boundary $3^d$ is approached. The headlamp is assumed to be mounted three and a half feet above the roadway and tilted downward two feet per one hundred feet. Under these conditions the axis of the beam will be one and one-half feet above the roadway at a distance of one hundred feet. The glare line indicated in Figure 3 is five feet above the road level and will represent the approximate level of the eyes of an approaching driver.

In order that an approaching driver may pass with safety he should be protected as well as possible against glare from a position two hundred feet in front to the position of passing. The intensity of the beam at point 7, Figures 3 and 4, will give a fair measure of the glare before the driver has turned out for passing. The intensity at the point 8 will give a fair measure of the glare after the driver has turned out for passing. Point 9 represents that point in the beam which will strike the roadway two hundred feet directly in front of the car. The highest possible illumination should be obtained at this point consistent with a sufficient suppression of glare at point 7. Point 10 represents a point in the road, seven feet to the right of the vertical axis of the lamp and one hundred feet in front of the car. Considerable degree of illumination is required at this point so that ditches, curbs and other obstacles may be easily discerned when the driver is turning out to pass an approaching driver. The intensity secured at points 9 and 10 are a fair measure of the road illumination secured. At the same time however, it is desirable on account of left hand turns to have a fairly good road illumination one hundred feet in front of the car and to the left of the axis.

It will be noted in Figure 3 that the more intense portion of the beam falls on point 9 and therefore the unmodified beam will give satisfactory illumination at that point. The extreme edge of the beam falls on point 10 so the illumination will not be sufficient at that point. The unmodified beam is not wide enough to illuminate the whole width of the road.

It will be noted that while point 7 lies without the most intense portion of the beam it is close enough to the axis of the beam to receive light from a major portion of the wider cones proceeding from the reflector. Point 8 receives light from the margin of the widest cones. The unmodified beam will give glare if good illumination is obtained two hundred feet in front of the car.

These objections are overcome by the plate shown in Figs 1 and 2, in which AB is a concave cylindrical surface which forms in conjunction with the outer surface of the plate a plano-concave lens. At the point C this concave surface has been stepped so as to reduce the weight of the glass. BD is a convex cylindrical surface which in conjunction with the outer surface of the plate forms a plano-convex lens. The convex surface is stepped at the point E so as to reduce the weight of the glass.

The rays of light 1 to 6, shown on Figs. 1 and 2, represent the axes of typical cones of light, reflected from the reflector used with such plates. The following exposition will show how the lenticular surfaces operate on such cones to solve the problem. These cones will be substantially normal to the front face of the plate. The points where 2 and 5 strike the plate lie in planes which are parallel to the front face and these rays will be emitted at $2^a$ and $5^a$ without change in direction. The interior surfaces intercepting rays 1 and 6 are inclined so that such rays are deviated toward the left and emitted in directions $1^a$ and $6^a$. Owing to the curvature of the inner surfaces intermediate rays between 1 and 2 will be deviated to a gradually lessening degree as $2^a$ is approached. In the same way intermediate rays between 6 and 5 will be deviated to a gradually lessening degree as $5^a$ is approached. The interior surfaces intercepting rays 3 and 4 are inclined so that they are deviated towards the right and emitted in directions $3^a$ and $4^a$. Intermediate rays between 3 and 2 and between 4 and 5 will be deviated to a gradually lessening degree as $2^a$ and $5^a$ are approached.

The spot actually produced on a vertical screen by a headlamp when covered with the plate is in the form of a horizontal arrow head with the point towards the left and the barb toward the right. A band running from the point to the center of the base is brightest. The surrounding portion of the spot is less definite and of much less intensity. This form of spot meets modern specifications for headlighting very satisfactorily.

Fig. 4 is a diagrammatic view similar to Fig. 3. The arrow shaped spot $3^d$ represents the extreme limit of the combined image obtained from a headlamp when covered with the plate. The band $1^d$ represents the brightest portion of the combined spot produced with a headlamp and this plate. The mounting height and tilt of lamp and other conditions are the same as those assumed in Figure 3.

It will be noted that the bright part of the beam has been spread laterally so as to give good illumination at points between 9 and 10 and also at corresponding points to the left of the axis. The plate spreads the brightest part of the beam so that good illumination is obtained across the whole surface of the road. Point 7 will receive light from only a small portion of the wider cones. Therefore the lamp with plate will give great reduction in glare at distant points in comparison with the unmodified beam Fig. 3. Point 8 lies entirely without the beam, therefore, the lamp with plate will give great reduction in glare for the approaching driver after he has turned out for passing. In any particular type of lamp the beam should be depressed or the candle power of the lamp lowered until the desired minimum values are reached.

The action of the plate as described is to bend the central portion of the beam to one side and the side portions of the beam to the opposite side. Referring to Fig. 2 if the plane surface be placed against the headlamp instead of the curved surface the resultant action on the projected light rays will be exactly the same and such use comes within the scope of my invention.

Fig. 6 shows a modification of my invention in which the concave cylindrical surface AB on the interior combined with the concave cylindrical surface IJ on the exterior forms a concave lens and the convex surface BD on the interior combined with the convex cylindrical surface JK on the exterior forms a convex lens. The lens surfaces are stepped at E. L. M. and N to reduce the thickness of the glass. The light rays 1—6 represent the axes of typical projected cones of light and will be substantially normal to the general surface of the plate.

The resultant action on the projected light rays will be exactly the same as in the type described. Such a construction comes within the scope of my invention.

The form of lens described is especially adapted for use with tilted headlamps. In case it be desirable to use the headlamp in a horizontal position the plane surface may be set at an inclination to refract the light downward or may be broken up into plane surfaces at varying inclinations so as to modify the vertical distribution of the projected light rays as desired. Thus in Fig. 5 I show a vertical cross-section of such a modification in which the surface H is provided with vertical cylindrical elements such as are shown in Fig. 2. On the opposite side of the lens the plane surfaces G are inclined with reference to the general plate level. Light rays proceeding from the reflector such as 7, 8, and 9 will be deviated horizontally by the cylindrical element H, pass through the lens and be depressed downward by the prisms G in directions such as 7ª, 8ª and 9ª. The degree of depression produced by the prisms G will depend on their inclination with reference to the general lens surface.

In the claims I have used the expression "elements" to designate the different portions of the lens. By this is meant a single portion operating in the manner shown or such single portion broken up into a plurality of portions according to the usual Fresnel construction.

I claim:

1. A light transmitting cover for a refractor divided vertically into two substantially equal sections, one section comprising similar vertical elements forming a cylindrical plano convex lens adapted to converge parallel rays incident thereon, and the second section comprising similar vertical elements forming a cylindrical plano concave lens adapted to diverge parallel rays incident thereon, the relation of elements being such that the total beam projected will be substantially apioid.

2. A flat light transmitting cover for a refractor one face being divided into two equal sections, one section being a concave cylindrical surface and the other section being a convex cylindrical surface, the axis of each cylinder being parallel with the central division line and lying in a plane normal to the cover and intersecting the corresponding section of the cover, the opposite face having a plurality of horizontal prisms formed to depress the beam.

3. A flat light transmitting cover for a refractor divided into sections by a line through its center, one section being a cylindrical plano-convex lens and the other being a cylindrical plano-concave lens, the axis of each cylinder being parallel with the central division line and lying in a plane normal to the cover and intersecting the corresponding section of the cover.

Signed at Newark in the county of Licking and State of Ohio February A. D. 1920.

WILLIAM A. DOREY.